US010562556B1

(12) United States Patent
Horowitz

(10) Patent No.: US 10,562,556 B1
(45) Date of Patent: Feb. 18, 2020

(54) FOLDING WAGON HAVING FOLD-DOWN SEATS

(71) Applicant: Brian Horowitz, Lake Forest, CA (US)

(72) Inventor: Brian Horowitz, Lake Forest, CA (US)

(*) Notice: Subject to any disclaimer, the term of this patent is extended or adjusted under 35 U.S.C. 154(b) by 0 days.

(21) Appl. No.: 16/043,819

(22) Filed: Jul. 24, 2018

(51) Int. Cl.
*B62B 3/00* (2006.01)
*B62B 7/00* (2006.01)
*B62B 7/06* (2006.01)
*B62B 3/02* (2006.01)
B62B 5/06 (2006.01)
B62B 5/08 (2006.01)

(52) U.S. Cl.
CPC ............. *B62B 3/007* (2013.01); *B62B 3/025* (2013.01); *B62B 7/008* (2013.01); *B62B 7/06* (2013.01); *B62B 5/067* (2013.01); *B62B 5/082* (2013.01); *B62B 7/004* (2013.01); *B62B 2205/06* (2013.01); *B62B 2205/24* (2013.01)

(58) Field of Classification Search
CPC .......... B62B 3/007; B62B 3/025; B62B 7/06; B62B 7/008; B62B 7/004; B62B 2205/24; B62B 2205/06; B62B 5/082; B62B 5/067
See application file for complete search history.

(56) References Cited

U.S. PATENT DOCUMENTS

| 8,011,686 | B2 | 9/2011 | Chen et al. | |
| 8,220,824 | B2 | 7/2012 | Chen et al. | |
| 8,388,015 | B2 | 3/2013 | Chen et al. | |
| 8,851,503 | B2* | 10/2014 | Tyson, III | A47C 1/14 280/648 |
| 9,145,154 | B1* | 9/2015 | Horowitz | B62B 3/025 |
| 9,623,890 | B1* | 4/2017 | Horowitz | B62B 3/022 |
| 9,771,093 | B2 | 9/2017 | Horowitz | |
| 10,099,711 | B1* | 10/2018 | Sun | B62B 3/007 |
| 10,300,934 | B2* | 5/2019 | Ostergaard | B62B 3/007 |
| 2007/0284900 | A1* | 12/2007 | Sze | B62B 3/007 296/26.15 |
| 2008/0122191 | A1* | 5/2008 | Johnson | B62B 3/007 280/47.38 |
| 2012/0235372 | A1* | 9/2012 | Herlitz | B62B 7/04 280/47.38 |
| 2014/0353945 | A1* | 12/2014 | Young | B62B 3/02 280/650 |
| 2015/0084298 | A1* | 3/2015 | Herlitz | B62B 3/02 280/87.01 |

(Continued)

*Primary Examiner* — Erez Gurari
(74) *Attorney, Agent, or Firm* — Morland C. Fischer

(57) ABSTRACT

Disclosed herein is a folding wagon that is capable of being folded between an expanded open configuration at which a variety of articles or children are carried in a basket of the wagon and a compact collapsed configuration to facilitate storage or transport when the wagon is not being used. A pair of fold-down seats which are carried inside the basket to transport small children are rotatable between a vertically upright position and a horizontally flat position. A handle is pivotally coupled to the front of the wagon and rotatable between a first position lying inside the basket and a second position extending outwardly from the front of the wagon. A handlebar is pivotally coupled to the rear of the wagon and rotatable between a first position extending horizontally outward from the rear of the wagon and a second position extending vertically downward alongside the wagon.

23 Claims, 13 Drawing Sheets

(56) References Cited

U.S. PATENT DOCUMENTS

| | | | |
|---|---|---|---|
| 2016/0031469 A1* | 2/2016 | Bowman | B62B 5/082 |
| | | | 280/647 |
| 2017/0021850 A1* | 1/2017 | Bowman | B62B 3/007 |
| 2018/0118243 A1* | 5/2018 | Fitzwater | B62B 7/008 |
| 2018/0170418 A1* | 6/2018 | Choi | B29C 35/02 |
| 2018/0297622 A1* | 10/2018 | Chen | B62B 3/025 |
| 2018/0327011 A1* | 11/2018 | Horowitz | B62B 3/02 |
| 2019/0092362 A1* | 3/2019 | Ostergaard | B62B 3/007 |
| 2019/0092363 A1* | 3/2019 | Ostergaard | B62B 3/007 |

* cited by examiner

FOLDING WAGON HAVING FOLD-DOWN SEATS

BACKGROUND OF THE INVENTION

1. Field of the Invention

This invention relates to a folding wagon that is capable of being folded between an expanded open configuration at which a variety of articles or children are carried in a basket of the wagon and a compact collapsed configuration at which to facilitate the storage or transport of the wagon when it is not being used. A pair of fold-down seats are carried inside the basket of the wagon to transport small children. The seats are rotatable from a vertical upright position to a horizontal flat position at which the wagon can be folded to its compact collapsed configuration.

2. Background Art

Wagons are known which are capable of being folded between open and collapsed configurations. Some folding wagons have a fabric basket that is sized to carry a variety of articles or small children when the wagon is unfolded for use in its open configuration. One example of such a folding wagon is available by referring to my U.S. Pat. No. 9,145,154 entitled FOLDING WAGON which issued Sep. 29, 2015.

My patented folding wagon has a fabric basket that is sized to transport both small children as well as articles such as sporting goods, picnic supplies, business inventory and the like. However, any children being carried in the wagon basket are subject to being jostled and tossed about, especially when the wagon moves over rough or steep terrain. In the case where articles and children are being transported in the basket at the same time, they might be thrown together which could result in injury to the children and damage to the articles. Accordingly, it would be desirable to modify my folding wagon to include fold-down seats in which children being transported in the wagon basket can be restrained while still permitting the wagon to be folded after the children have been removed from their seats and the seats have been folded flat against the bottom of the basket.

SUMMARY OF THE INVENTION

In general terms, disclosed herein is a folding wagon which includes a flexible basket. The folding wagon transports a variety of articles and/or children that are located in the wagon basket. The folding wagon also includes a frame and a basket support rack above which the basket is supported and held up by the frame. The frame and the rack are adapted to be folded so that the wagon is correspondingly folded from an expanded open configuration during use to a compact collapsed configuration to facilitate transport and/or storage of the wagon when it is not in use. The wagon includes pairs of front and rear wheels attached to the wagon frame to roll over a surface in response to a pulling or a pushing force that is applied to a wagon transport handle.

A pair of fold-down seats are carried by the wagon at opposite ends of the wagon basket. Each fold-down seat has a horizontal seat portion to support the weight of a seated individual and a back portion extending upwardly from the seat portion to support the individual's back. The seat portion of the seat is surrounded by a seat support frame having legs that are pivotally connected to the basket support rack lying below the basket. The back portion of the seat is surrounded by a back support frame having legs that are also pivotally connected to the basket support rack. The seat and back support frames are rotatable with one another relative to the basket support rack from a vertically upright position standing upwardly within the basket and a horizontally flat position lying against the bottom of the basket at which the wagon can be folded to its collapsed configuration. A foot pocket extends downwardly from the bottom of the wagon basket through a foot extension opening in the basket support rack within which to receive the feet of the seated individual and thereby provide the individual with additional leg room.

The wagon transport handle is pivotally connected to the wagon frame at the front of the folding wagon. The handle is adapted to be rotated relative to the frame between a first position lying inside the wagon basket to shorten the length of the wagon and a second position lying outside and extending from the front of the basket at which to receive the pulling or pushing force. A handlebar is pivotally connected to the wagon frame at the rear of the folding wagon by means of a pair of handlebar uprights. The handlebar is adapted to be rotated relative to the pair of handlebar uprights between a first position extending horizontally outward from the handlebar uprights at which to receive a pushing or a pulling force for causing the wagon to roll on its wheels and a second position extending substantially vertically downward to lie alongside the handlebar uprights and thereby further shorten the length of the wagon to facilitate its transport or storage. An optional utility basket is detachably connected to the wagon at the pair of handlebar uprights thereof.

An optional table is detachable connected to the folding wagon so as to extend laterally across the wagon basket. A pair of hollow table mounting pipes extend upwardly from the basket support rack to run vertically along opposite sides of the basket. A corresponding pair of mounting posts which extend downwardly from opposite sides of the table are removably received within respective ones of the mounting pipes by which to hold the table in place across the basket. A pair of cup receptacles are located in the table to receive and retain conventional drinking cups therewithin.

DESCRIPTION OF THE PREFERRED EMBODIMENT

Figure 1:
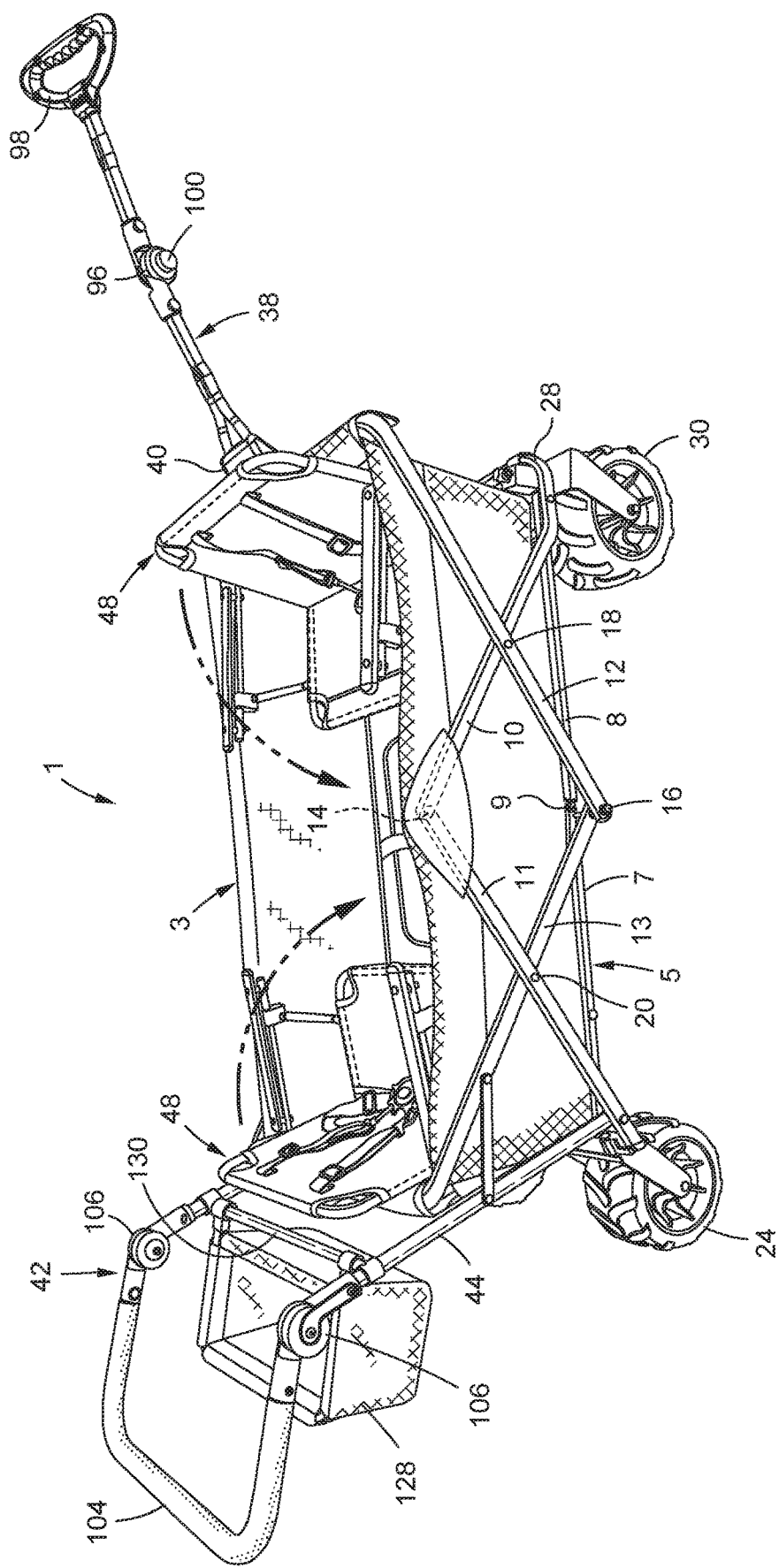
FIG. 1 is a perspective view showing a folding wagon in an expanded open configuration and having a pair of fold-down seats in an upright position and located at opposite ends of a basket of the wagon.
Figure 2:
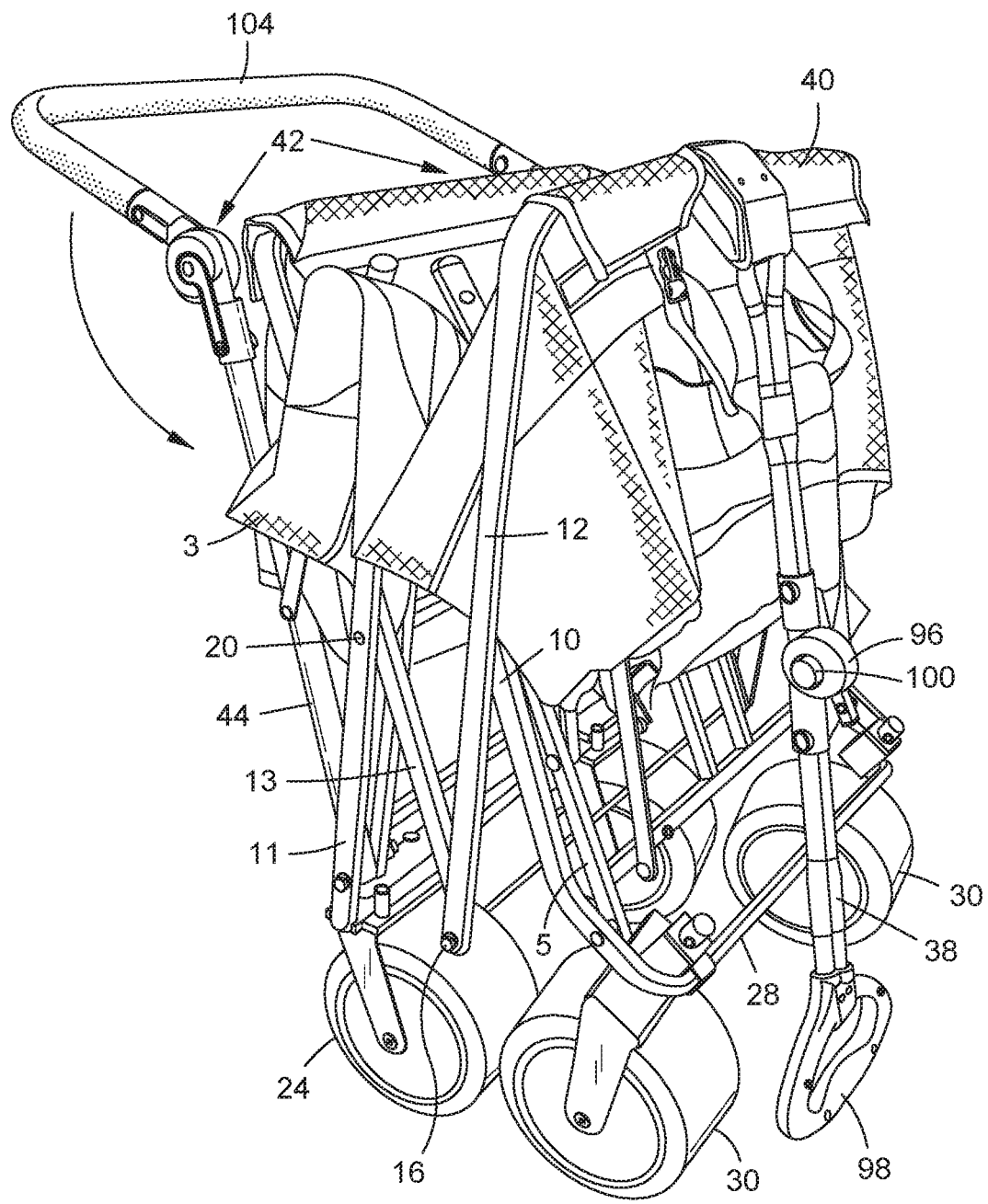
FIG. 2 shows the folding wagon of FIG. 1 in a compact closed configuration.
Figure 3:
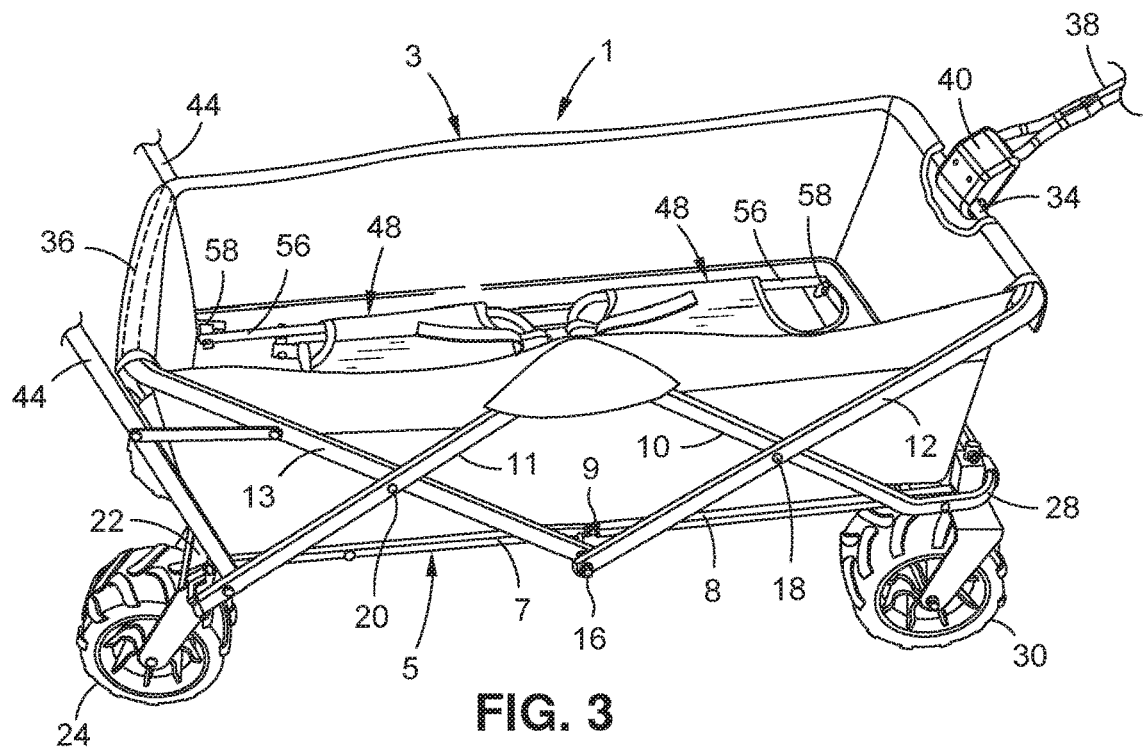
FIG. 3 shows the folding wagon in its expanded open configuration of FIG. 1 with the pair of fold-down seats rotated to a horizontal flat position lying against the bottom of the wagon basket.

Referring initially to FIGS. 1-3 of the drawings, there is shown a folding wagon 1 that is adapted to be folded between an expanded open configuration during use and a compact collapsed configuration at which to facilitate its storage or transport when not in use. Folding wagons like that shown in FIG. 1 are generally known. For example, reference can be made to my U.S. Pat. No. 9,145,154 which shows and describes one example of a folding wagon of the kind in which the improvements to be described below can be incorporated. Therefore, the teachings of a folding wagon as disclosed in my aforementioned patent are incorporated herein by reference, and only a brief description of the folding wagon 1 will be provided below.

The folding wagon 1 includes a fabric basket 3 within which to carry a variety of articles including, but not limited to, sporting and camping goods, picnic supplies and business inventory. The fabric basket 3 is open at the top and closed along the bottom, front, rear and sides. The basket 3 sits upon and stands upwardly from a flat basket support rack 5 that lies at the bottom of the wagon 1. The basket 3 is attached to and held above the rack 5 by a folding wagon frame. The basket support rack 5 has opposite ends 7 and 8 that are pivotally connected together at a joint 9 and capable of being rotated towards one another so as to lie face-to-face in response to an uplifting pulling force applied thereto when the wagon is being folded to its compact collapsed configuration (best shown in FIG. 2).

However, it is to be understood that the advantages of this invention that will be described in greater detail hereinafter are also applicable to wagons which do not fold. In that case, the basket support rack 5 will remain flat such that the opposing ends 7 and 9 thereof remain stationary and will not rotate towards and away from one another.

The folding frame of the folding wagon 1 is manipulated to enable the wagon to be correspondingly folded from its expanded open configuration of FIGS. 1 and 3 at which articles are carried in the basket 3 to its compact collapsed configuration (shown in FIG. 2) at which the frame and the basket 3 are collapsed and the wagon is suitable for transport or storage. Prior to it being folded, the folding frame holds the basket 3 up so as to be seated on and stand above the basket support rack 5. Reference may also be made to my aforementioned U.S. Pat. No. 9,145,154 for details to explain the attachment of the basket 3 to the folding wagon frame so that the basket 3 is held above the basket support rack 5.

Briefly, each side of the wagon frame which lies adjacent one side of the wagon basket 3 includes an identical first pair of diagonally extending side support arms 10 and 11 and an identical second pair of diagonally extending side support arms 12 and 13. The first pair of diagonal side support arms 10 and 11 are connected to one another at first ends thereof by means of an upper pivot coupling 14, so that the support arms 10 and 11 project upwardly to make an angle of about 90 degrees. The second pair of diagonal side support arms 12 and 13 are also connected to one another at first ends thereof by means of a lower pivot coupling 16, so that the support arms 12 and 13 project downwardly to make an angle of about 90 degrees. The diagonally extending side support arms 10 and 12 are coupled to one another about midway between the first and opposite ends thereof by means of a pivot coupling 18, and the diagonally extending side support arms 11 and 13 are coupled to one another about midway between the first and opposite ends thereof by means of a pivot coupling 20.

Figure 15:
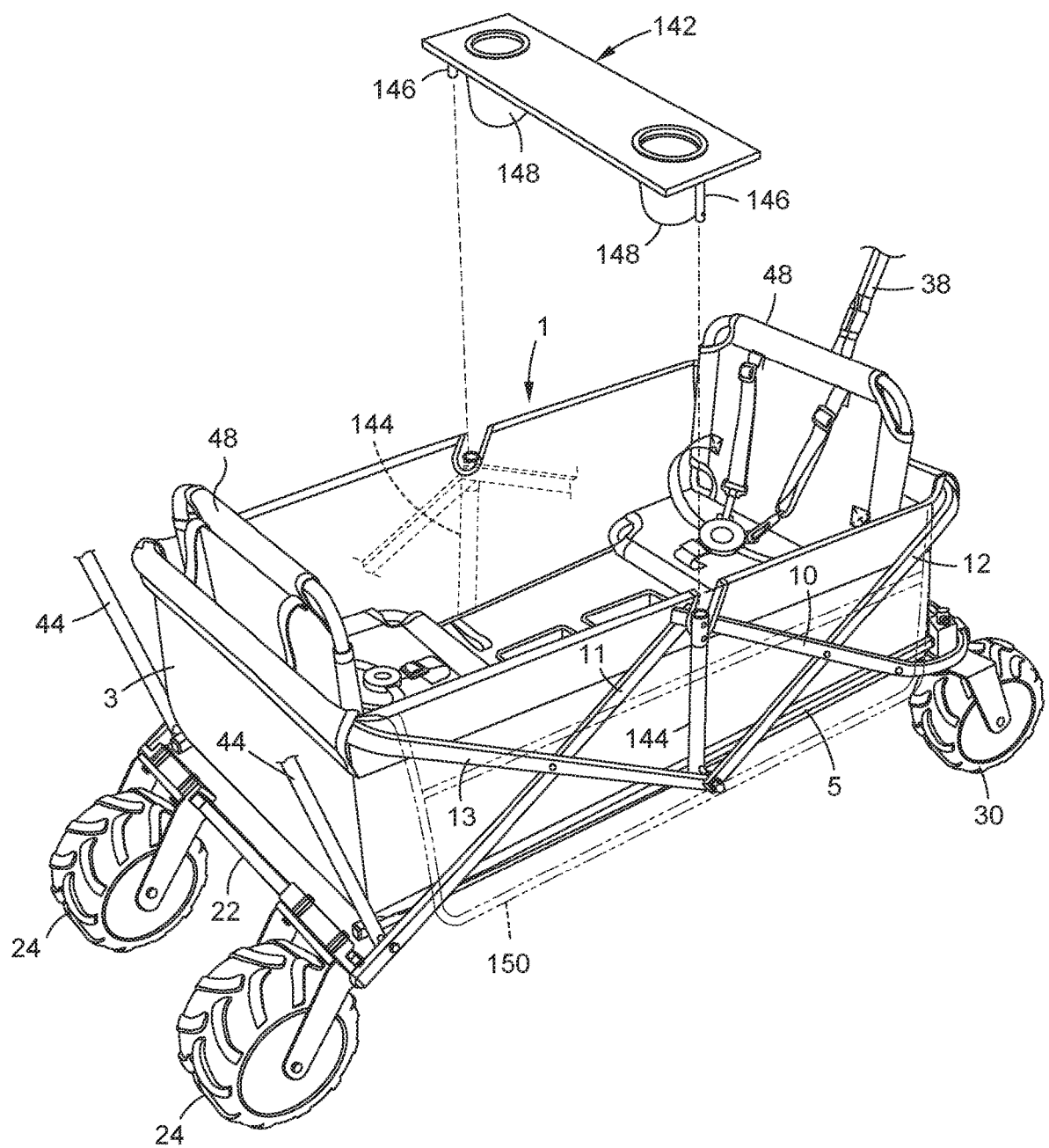
FIG. 15 shows an optional table having drinking cup receptacles to be detachably connected to the folding wagon so as to extend laterally across the wagon basket.
Figure 16:
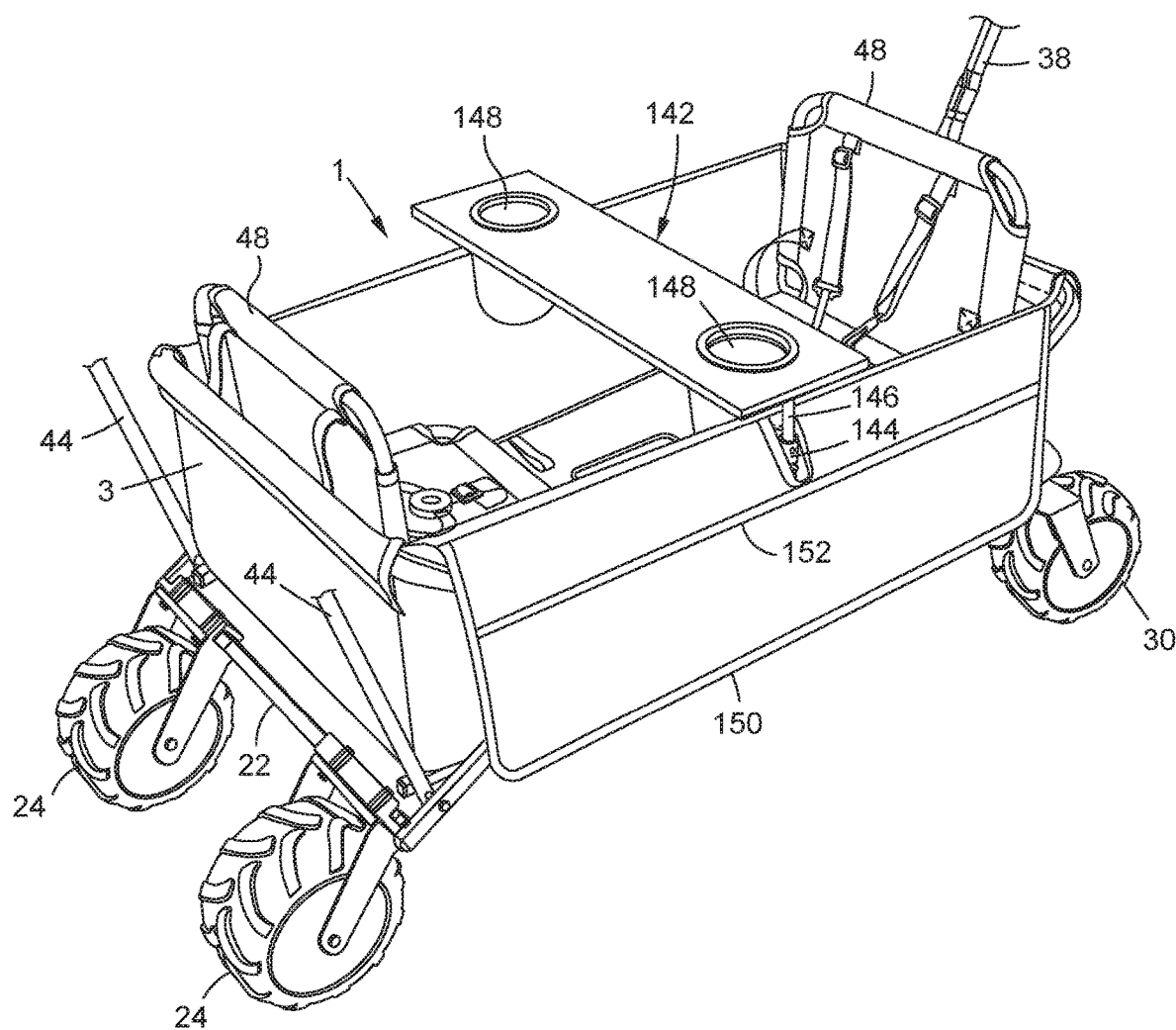
FIG. 16 shows the table of FIG. 15 after being detachably connected to the folding wagon across the wagon basket.

The opposite end of the side support arm 11 of the first pair of side support arms 10 and 11 is connected to one end of a rear wheel support track 22 (best shown in FIGS. 15 and 16). The rear wheel support track 22 is spaced from and located behind the basket support rack 5 at which a pair of rear wheels 24 of the folding wagon 1 are mounted. Each rear wheel 24 is pivotally connected to the rear wheel support track 22.

The opposite end of the side support arm 10 of the first of the pair of side support arms 10 and 11 of the wagon frame bends continuously around the front of the folding wagon 1 at which to form a front wheel support track 28 (best shown in FIG. 2). The front wheel support track 28 is spaced from and located ahead of the basket support rack 5 at which a pair of front wheels 30 of the folding wagon 1 are mounted. Each front wheel 30 is pivotally connected to the front wheel support track 28.

A horizontal extension 34 of the side support arm 12 of the second pair of side support arms 12 and 13 of the wagon frame (best shown in FIG. 3) bends continuously around and runs across the front of the folding wagon 1. The front of the wagon basket 3 is folded over and around the extension 34 of the side support arm 12 to help hold the basket 3 up so as to lay on and stand above the basket support rack 5 when the wagon 1 is in its expanded open configuration.

Likewise, a horizontal extension 36 of the side support arm 13 of the second pair of side support arms 12 and 13 of the wagon frame (also best shown in FIG. 3) bends continuously around and runs across the rear of the folding wagon 1. The rear of the wagon basket 3 is folded over and around the extension 36 of the side support arm 13 to help hold the basket 3 up so as to lay on and stand above the basket support rack 5 when the wagon is in its expanded open configuration.

As is best shown in FIG. 3, an articulating wagon transport handle 38 is pivotally connected by way of a tapered handle housing 40 to the basket support extension 34 which runs across the front of the folding wagon 1. A pulling force or a pushing force is applied to the wagon transport handle 38 by a user to cause the pairs of rear and front wheels 24 and 30 to roll over a surface by which the wagon 1 can be transported from place-to-place in a forward or backward direction. In the case where the folding wagon is folded to its compact closed configuration as shown in FIG. 2, the pairs of front and rear wheels 30 and 24 are rotated towards one another so as to lay on the ground, and the wagon transport handle 38 is rotated downwardly to also lay on the ground, so that a stand is created for holding the folded wagon upright on the ground. The operation and advantages of the wagon transport handle 38 will be explained in greater detail hereinafter.

A rotatable handlebar assembly 42 that is located at the rear of the folding wagon 1 is connected to the wagon frame by way of a pair of handlebar uprights 44 that extend from opposite ends of the handlebar assembly 42 to respective ones of the diagonal side support arms 11 located at opposite sides of the wagon basket 3. As with the wagon transport handle 38, a pushing or pulling force applied to the handlebar assembly 42 will cause the wagon to roll on its pairs of front and rear wheels 30 and 24 so as to move in a forward or rearward direction. The operation and advantages of the rotatable handlebar assembly 42 will also be explained in greater detail hereinafter.

As an important improvement relative to conventional wagons, the folding wagon 1 herein disclosed has a pair of fold-down seats 48 that are located inside the wagon basket 3 and in opposite facing alignment at the front and rear of the wagon so that small children can be seated in the seats 48 and transported alone or with other articles being carried inside the basket 3. As represented by the directional arrows in FIG. 1, the fold-down seats 48 are rotatable between an upright position shown in FIG. 1 standing vertically upwardly from the bottom of the wagon basket 3 to a flat position shown in FIG. 3 lying horizontally against the bottom of basket 3.

Figure 4:
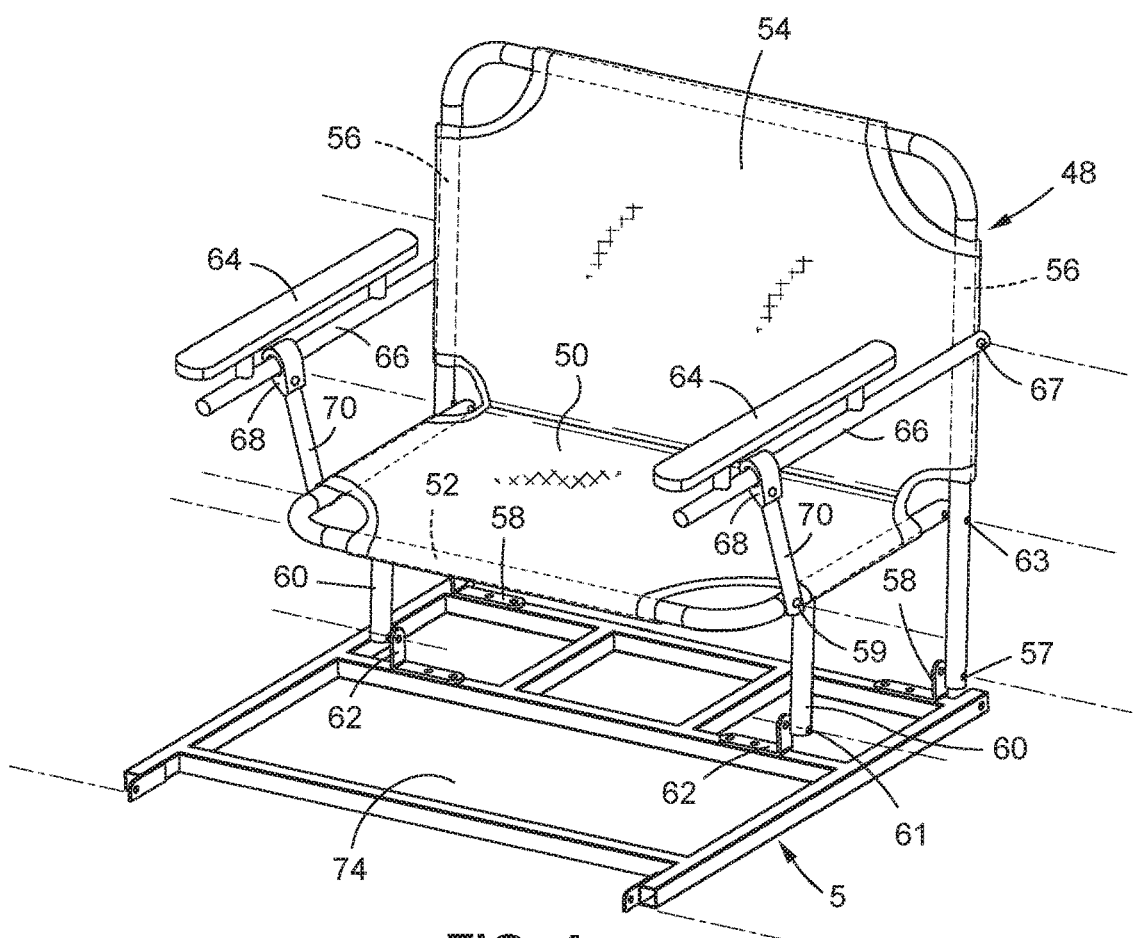
FIG. 4 shows one of the pair of fold-down seats in its upright position standing upwardly from and pivotally connected to a basket support rack of the folding wagon.

Referring in this regard to FIG. 4 of the drawings, one of the identical pair of fold-down seats 48 is shown in its upright position pivotally connected to the basket support rack 5 so as to stand upwardly above the bottom of the wagon basket 3 shown in FIG. 1. The fold-down seat 48 includes a horizontal seat portion 50 attached to and surrounded by a U-shaped seat support frame 52. A back portion 54 stands vertically upward from the seat portion 54 and is attached between a pair of rotatable legs 56 from a back support frame. The rotatable back support frame legs 56 of the fold-down seat 48 are pivotally connected by pivots 57 to respective L-shaped brackets 58 which are fixedly connected to opposite sides of the basket support rack 5 at the bottom of the folding wagon 1 (best shown in FIG. 4). The front corners of the U-shaped seat support frame 52 are pivotally connected by pivots 59 to first ends of a pair of rotatable front support legs 60. The opposite ends of the rotatable front support legs 60 are pivotally connected by pivots 61 to respective L-shaped brackets 62 which are fixedly connected to the basket support rack 5 in front of the L-shaped brackets 58. The rear ends of the U-shaped seat support frame 52 are pivotally connected by pivots 63 to the rotatable back support frame legs 56 approximately midway along the length thereof.

Arm rests 64 are mounted on respective horizontal arm rest support bars 66 above opposite sides of the seat portion 50 of the fold-down seat 48. First ends of the arm rest support bars 66 are pivotally connected by pivots 67 to the rotatable back support frame legs 56 above the pivots 63. Opposite ends of the arm rest support bars 66 are coupled by means of collars 68 to first ends of respective vertically upstanding rotatable arm rest braces 70. The opposite ends of the rotatable arm rest braces 70 are pivotally connected by the aforementioned pivots 59 to be joined to the front corners of the U-shaped seat support frame 52 and the first ends of the rotatable front support legs 60.

Accordingly, it may be appreciated that either one or both of the fold-down seats 48 at opposite ends of the folding wagon 1 can be rotated inside the basket 3 at pivots 57, 59, 61, 63 and 67 between their vertically upright and horizontally flat positions depending upon whether the seats 48 will be occupied by one riding in the basket 3. When the seats 48 are rotated to their flat position, the back portions 54 thereof rotate downwardly through an angle of about 90 degrees in the direction of the reference arrows shown in FIG. 1. That is, each vertical back portion 54 is initially rotated towards a horizontal seat portion 50 which then rotate together towards the bottom of the wagon basket 3. With the seat and back portions 50 and 54 of the seats 48 laying flat against one another and the bottom of the basket 3 as shown in FIG. 3, the folding wagon 1 is ideally suited to be folded into its compact collapsed configuration shown in FIG. 2.

Figure 5:
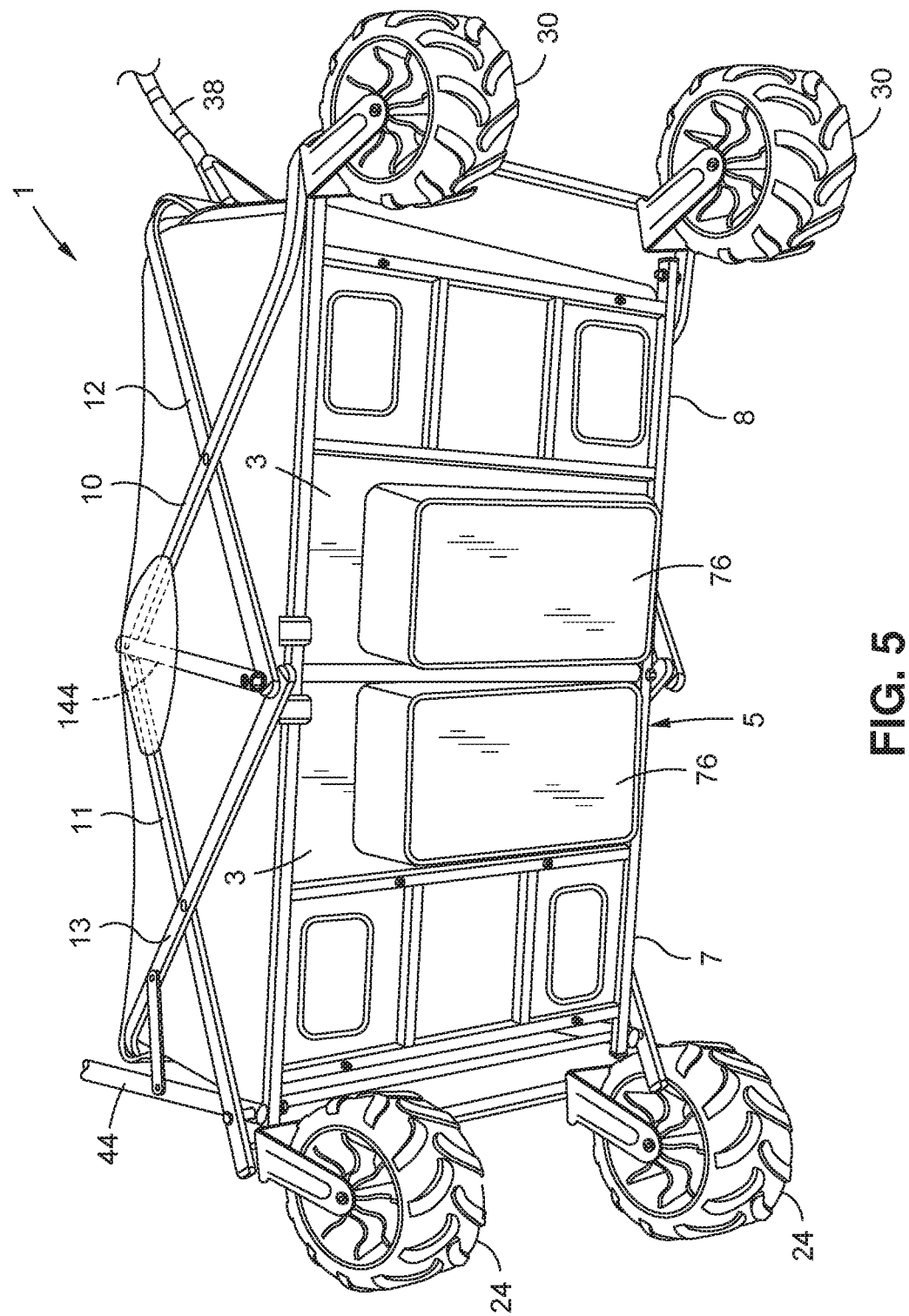
FIG. 5 shows the bottom of the folding wagon in its expanded open configuration with a pair of foot pockets lying underneath the wagon basket and extending below the basket support rack.

As shown in FIG. 4, there is a foot extension opening 74 formed through the basket support rack 5 below the wagon basket 3 and in front of each of the pair of fold-down seats 48 (only one seat being shown). With the seats 48 rotated to their vertical upright position of FIG. 4, one seated in either one of the seats 48 can move his feet towards the bottom of the basket 3 for receipt through the foot extension opening 74 in order to have more leg room and thereby improve his comfort while riding. As shown in FIG. 5 of the drawings, foot pockets 76 communicate with and extend downwardly from the bottom of the wagon basket 3 so as to lie below the basket support rack 5 for receipt through each of the foot extension openings 74 of FIG. 4. Each foot pocket 76 creates a deep enclosure to surround and retain the feet of the seated individual so as to prevent his feet from dragging against the ground while the wagon 1 is in motion.

Figure 6:
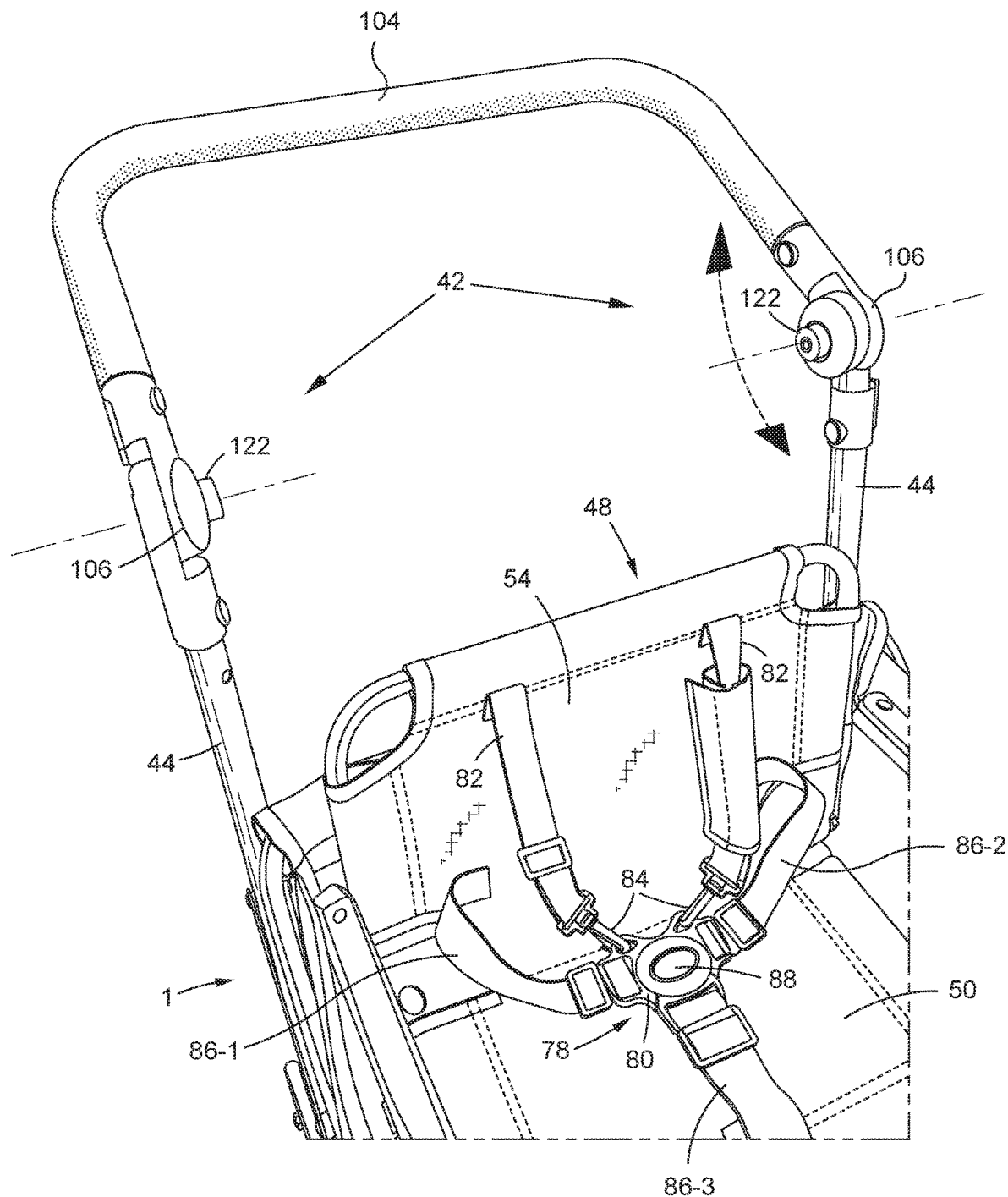
FIG. 6 shows a seat belt and shoulder harness assembly attached to one of the fold-down seats carried by the folding wagon.

FIG. 6 of the drawings illustrates one of a pair of identical push-button actuated seat belt and shoulder harness assemblies that are attached to the fold-down seats 48 (only one of which being shown) of the folding wagon 1 and used to surround the shoulders and waist and thereby restrain small children when the seats are in their upright position. In particular, each seat belt and shoulder harness assembly includes a conventional 3-point seat belt 78 that is connected by way of a central 3-point coupler 80 to a pair of shoulder retention straps 82 from a shoulder harness. That is, first ends of the shoulder retention straps 82 are detachably connected to the central coupler 80 by means of respective clips 84. The opposite ends of the shoulder retention straps 82 run through the back portion 54 of the seat 48 to be anchored in place at the outside of the basket 3 of the wagon 1 (not shown).

A pair of outstretched waist retention straps 86-1 and 86-2 of the 3-point seat belt 78 of the seat belt assembly are affixed (e.g., stitched) at the first ends thereof to the back portion 54 of the seat 48. The opposite ends of the waist retention straps 86-1 and 82-2 of the seat belt 78 are detachably connected to opposite sides of the 3-point coupler 80. The coupler 80 surrounds a manually operated push-button 88 that is activated to release the detachable connection of the straps 86-1 and 86-2 to the coupler 80. An intermediate leg retention strap 86-3 of the seat belt 78 is affixed (e.g., stitched) at one end thereof to the seat 48 atop the seat portion 50 thereof. The opposite end of the intermediate leg retention strap 86-3 is fixedly connected to the 3-point coupler 80 between the pair of outstretched waist retention straps 86-1 and 86-2.

By depressing the push-button 88 that is surrounded by the central 3-point coupler 80 to which the pair of outstretched waist retention straps 86-1 and 86-2 of the seat belt 78 are detachably connected, the straps will be detached from the coupler 80. The shoulder retention straps 82 of the shoulder harness can be separated from the coupler 80 by detaching the clips 84 thereof from the coupler. The 3-point seat belt 78 is now opened to enable the child being transported in the wagon to be removed from his seat 84.

Figure 8:
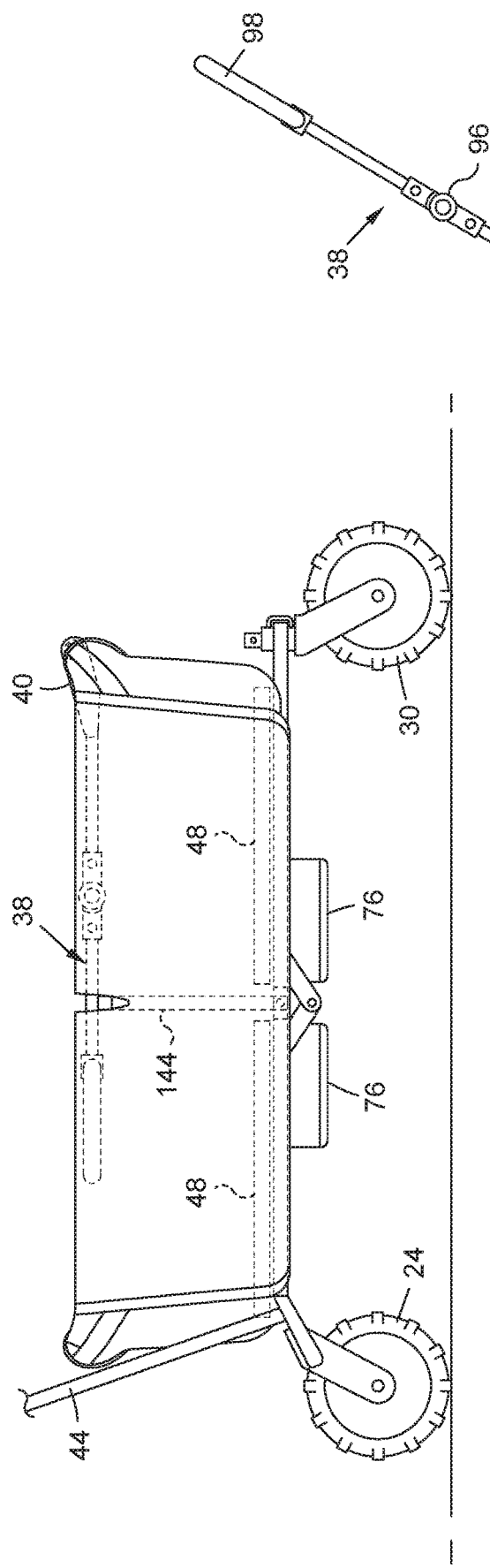
FIG. 8 shows the wagon transport handle of FIG. 7 after being rotated relative to the frame so as to lie inside the wagon basket.
Figure 9:
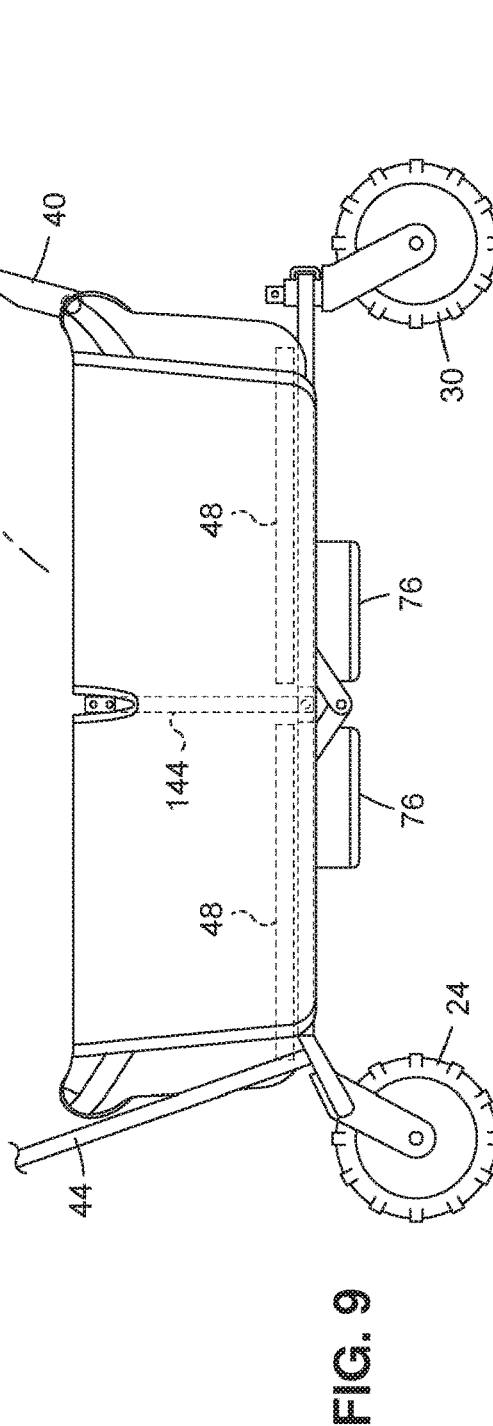
FIG. 9 shows the wagon transport handle after being rotated relative to the frame outside the wagon basket so as to extend from the front of the folding wagon.
Figure 10:
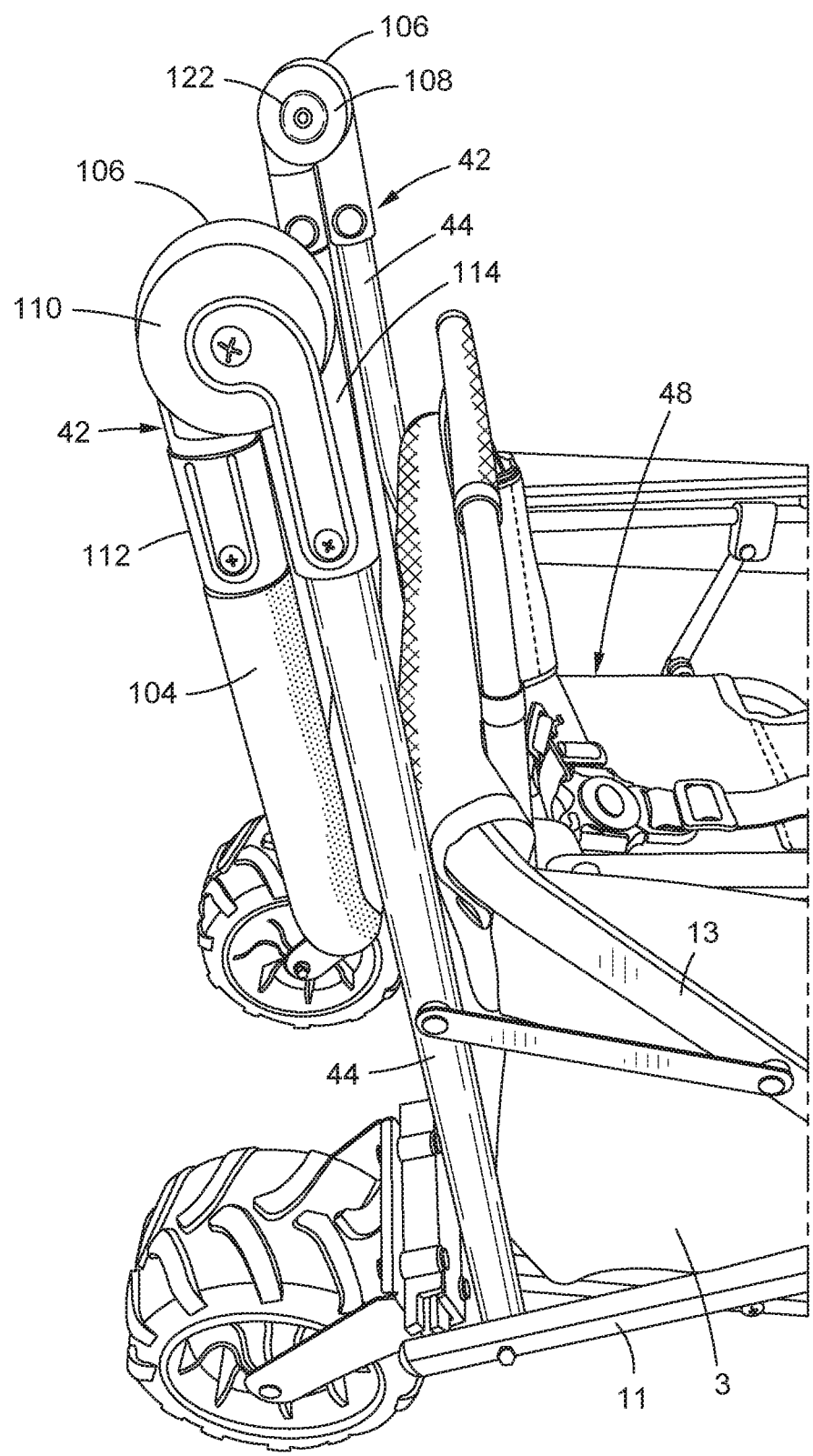
FIG. 10 shows a handlebar pivotally coupled to a pair of handlebar uprights located at the rear of the folding wagon after the handlebar is rotated downwardly to a substantially vertical position lying alongside the handlebar uprights.

FIGS. 8-10 of the drawings illustrates details of the articulated wagon transport handle 38 to which a pulling or pushing force is applied to cause the wagon 1 to roll from place-to-place. The wagon transport handle 38 includes a coupled portion 92 and a force receiving portion 94 that are pivotally connected together at opposing first ends thereof to a push-button actuated elbow 96. Located at the opposite end of the coupled portion 92 of the wagon handle 38 is the aforementioned tapered handle housing 40. As earlier described, the handle housing 40 is pivotally coupled in surrounding engagement with the horizontal extension 34 (best shown in FIG. 3) that runs across the front of the wagon 1 between the side support arms 12 at opposite sides of the wagon basket 3.

By virtue of the pivotal connection of the wagon handle 38 to the front of the wagon 1, the handle can be rotated in opposite directions relative to the wagon frame around the horizontal extension 34 through an angle of at least 180 degrees between a first position lying entirely inside the wagon basket 3 (best shown in FIG. 9), at which it can be grasped by a child being transported in the back of the wagon to give him the feeling of being able to steer the wagon, and a second position, lying entirely outside and extending from the front of the wagon basket 3 (best shown in FIG. 10), at which to receive a pulling or a pushing force at a gripping handle 98 located at the opposite end of the force receiving portion 94 thereof. The handle housing 40 includes a tapered surface 99 that enables the handle 38 to be rotated completely around the horizontal extension 34 to a location deep within the basket 3.

The coupled and force receiving portions 92 and 94 of the wagon handle 38 are locked end-to-end so as to be axially aligned with one another by the elbow 96 which is located at approximately the midpoint of the handle. The elbow 96 includes a user actuated push-button 100 that is depressed in order to release the end-to-end locking connection of the coupled and force receiving portions 92 and 94. In this case, the force receiving portion 94 can now be rotated in the direction of the reference arrow shown in FIG. 8 through an angle of about 180 degrees relative to the coupled portion 94 so as to lie alongside the coupled portion 92. With the coupled and force receiving portions 92 and 94 of the handle 38 lying one against the other, the folded wagon handle 38 can be rotated at the handle housing 40 around the horizontal extension 34 so as to lie inside the wagon basket 3 and thereby achieve a more compact configuration that is ideal for the wagon to be carried by some motor vehicles without first having to fold the wagon to its collapsed configuration.

Figure 7:
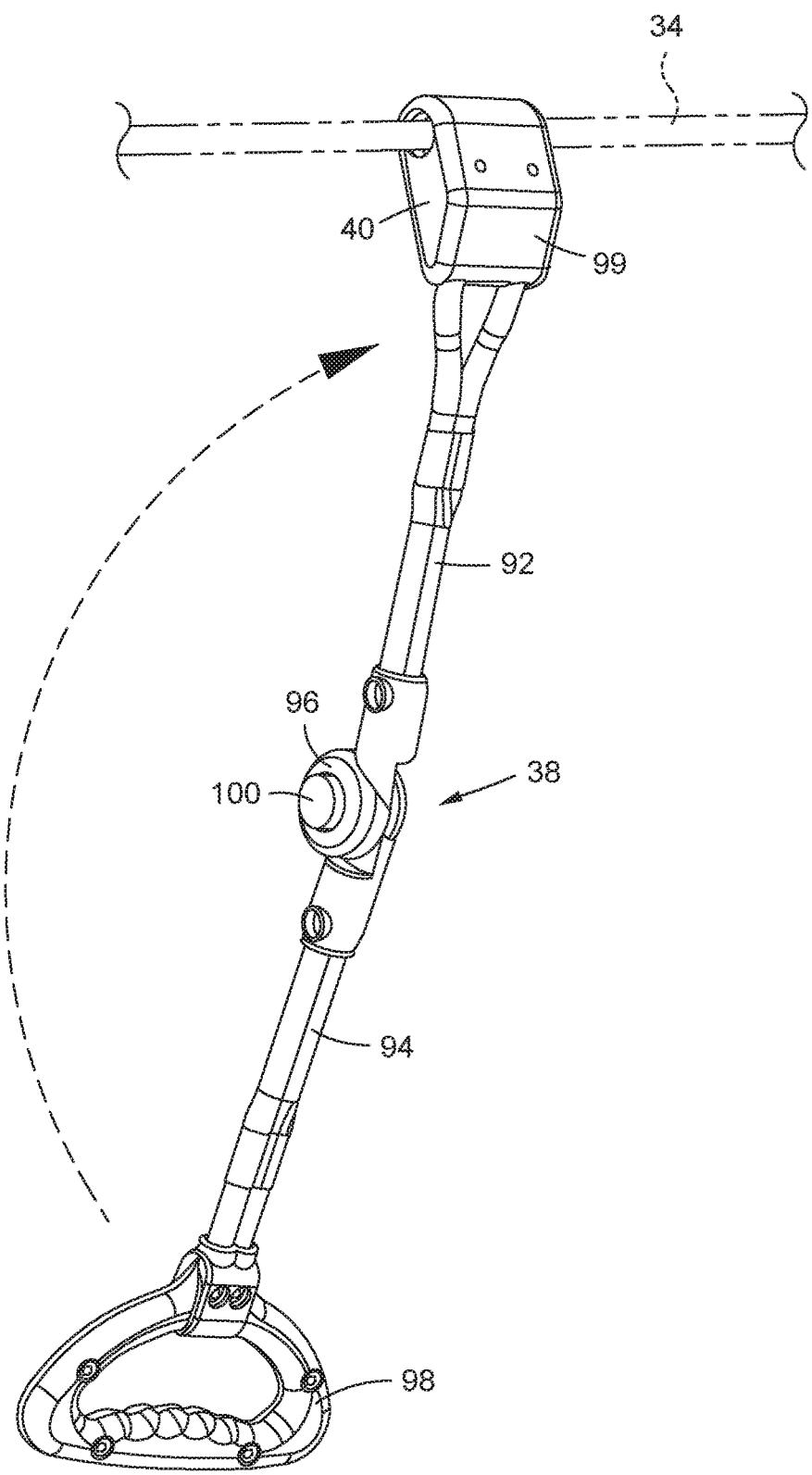
FIG. 7 shows a wagon transport handle pivotally connected to the front of the wagon and rotatable relative to a basket supporting frame thereof.

Turning now to FIGS. 11-15 of the drawings, details are provided of the rotatable handlebar assembly 42 that is located behind the wagon basket 3 at the rear of the folding wagon 1. The handlebar assembly 42 includes a U-shaped gripping bar 104 (best shown in FIG. 14) which is pivotally connected at opposite ends thereof by means of a pair of push-button activated couplers 106 to respective handlebar uprights 44 that run substantially vertically upward from the wagon frame to lie above the wagon basket 3 (best shown in FIG. 11). As is best shown in FIG. 7, the gripping bar 104 of the handlebar assembly 42 is rotatable in the opposite directions indicated by the reference arrows relative to the handlebar uprights 44 at the push-button couplers 106 through an angle of about 235 degrees between a horizontal position (as shown in FIG. 1) extending outwardly from the handlebar uprights 44 at which to receive a pushing or pulling force and a substantially vertical position (as shown in FIG. 10) extending downwardly and lying alongside the handlebar uprights 44 at which the overall length of the wagon is reduced to facilitate its transport and storage.

Figure 11:
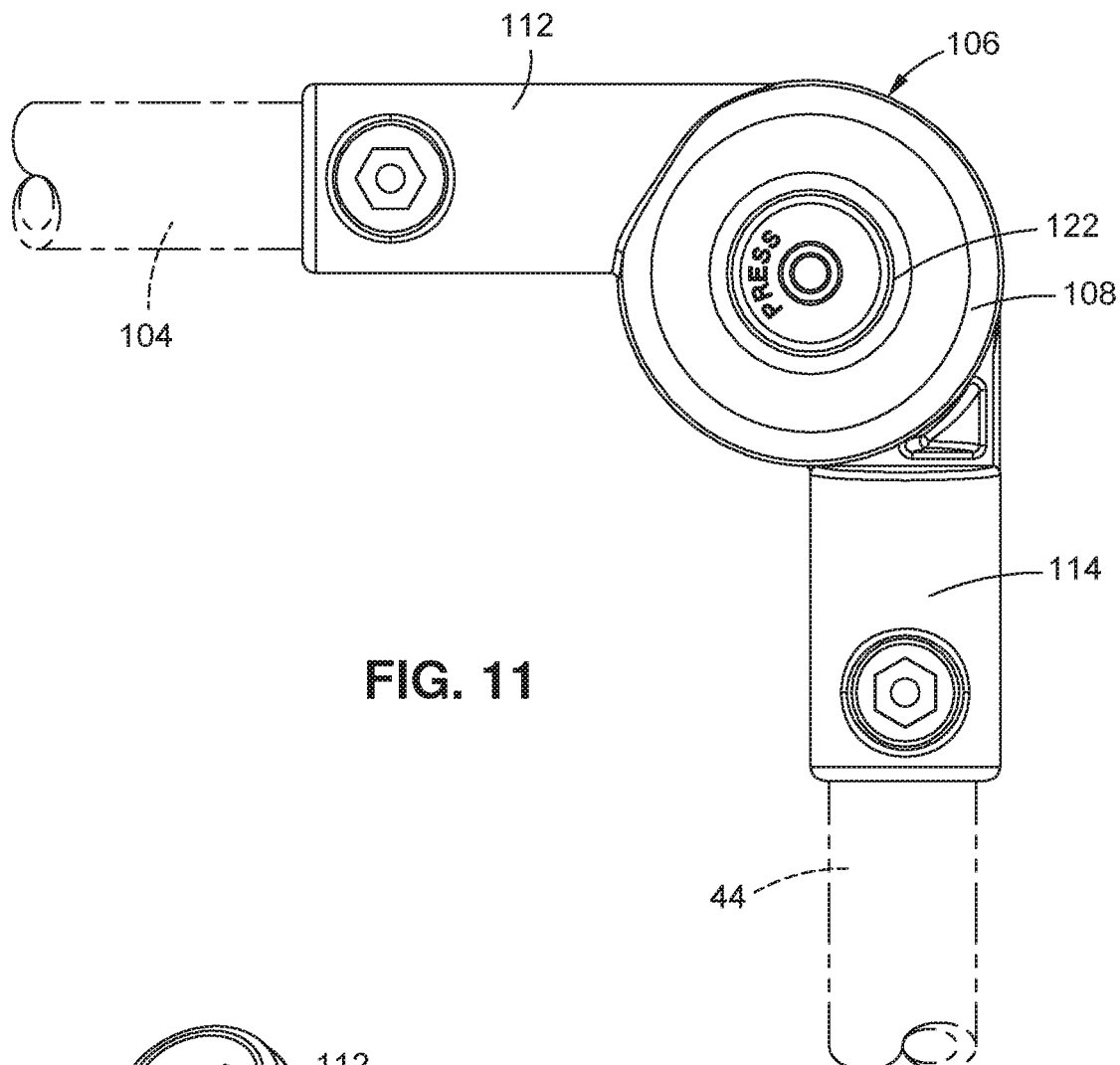
FIGS. 11-13 show details of a push-button actuated coupler by which the handlebar of FIG. 10 is pivotally coupled and rotatable relative to the pair of handlebar uprights located at the rear of the folding wagon.

Each one of the pair of push-button actuated couplers 106 includes upper and lower gear drive housings 108 and 110. A tubular upper handle arm 112 extends from the upper gear housing 108, and a tubular lower handle arm 114 extends from the lower gear housing 110. As is best shown in FIG. 11, the tubular upper handle arm 112 is sized to receive therewithin and be attached to one end of the U-shaped gripping bar 104. The tubular lower handle arm 114 is sized to receive therewithin and be attached to one end of one handlebar upright 44, whereby the gripping bar 104 and the upright 44 are held end-to-end one another at the coupler 106.

Figure 13:
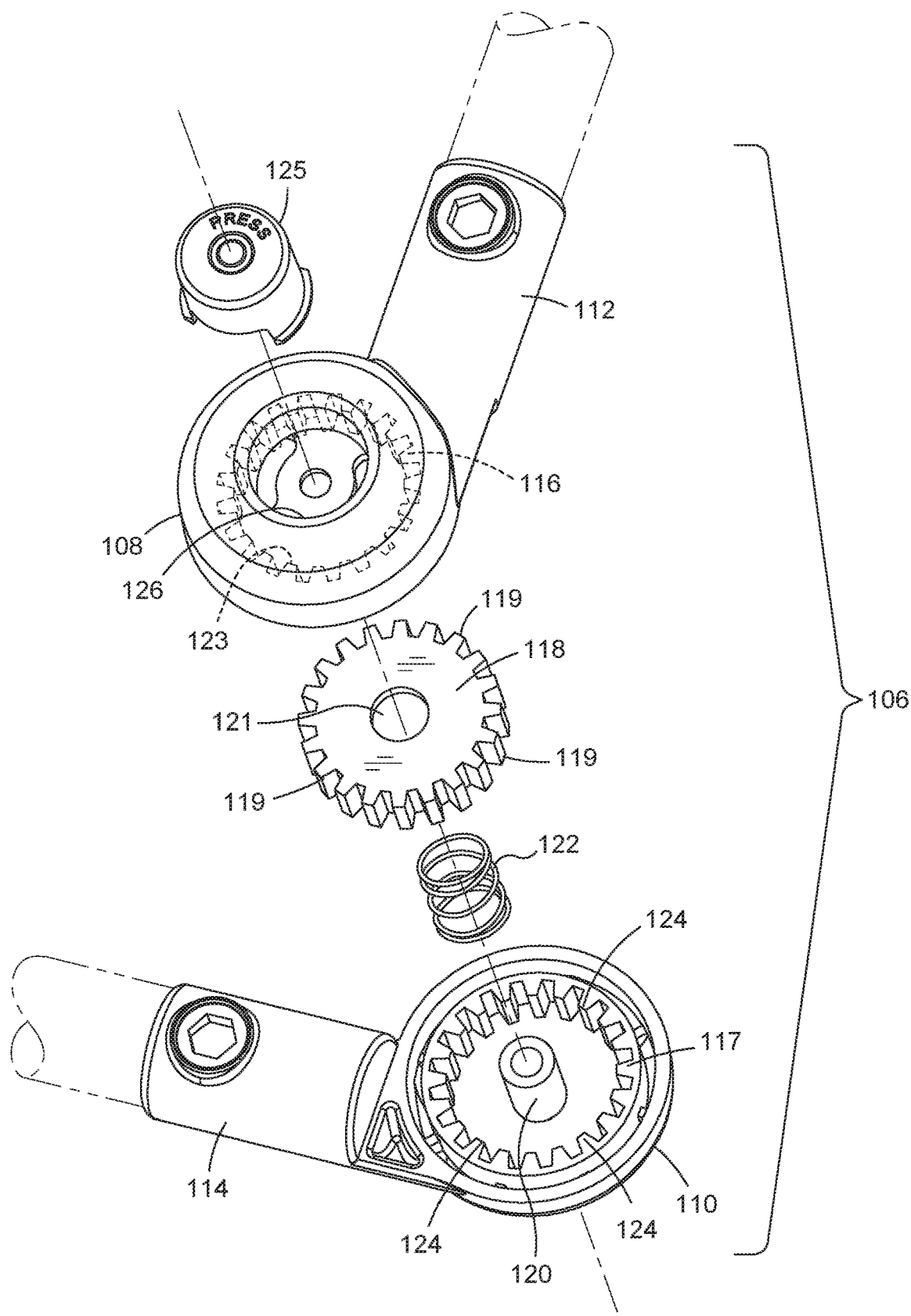

As is best shown in FIG. 13, a stationary circular gear drive 116 is located inside the upper gear drive housing 108. A similar gear drive 117 is located inside the lower gear drive housing 110 in opposite facing alignment with gear drive 116. Located between the upper and lower gear drive housings 108 and 110 is a disc shaped gear wheel 118 that is mounted on and slidable along a cylindrical gear wheel shaft 120 that extends from the lower gear drive housing 110 through a hole 121 in the center of the wheel 118. A set of teeth 119 extend around the gear wheel 118. A (e.g., coil) spring 122 is located between one face of the gear wheel 118 and the opposing lower gear drive housing 110. The gear drives 116 and 117 of the upper and lower gear drive housings 108 and 110 have sets of teeth 123 and 124 running therearound and adapted to be meshed together with the teeth 119 of the gear wheel 118.

Figure 12:
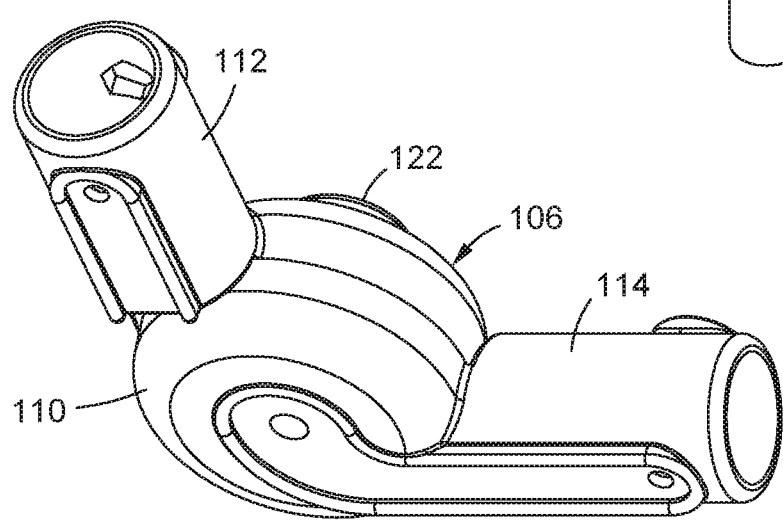

That is, with the push-button actuated coupler 106 in its assembled configuration of FIGS. 11 and 12, the gear wheel 118 is initially biased along the shaft 120 by the spring 122 so as to lie partially within each of the gear drives 116 and 117 of the upper and the lower gear drive housings 108 and 110. In this case, the teeth 119 of the gear wheel 118 are meshed together with the teeth 123 and 124 from each of the opposing gear drives 116 and 117, whereby the position of the gripping bar 104 of the rotatable handlebar assembly 42 is locked in place by the gear wheel 118 relative to the handlebar uprights 44.

A manually operated push-button 125 is received within a cavity 126 that is formed in the top of the upper gear drive housing 108 of each of the pair of couplers 106. The push-button 125, the center hole 121 through the gear wheel 118, and the gear wheel shaft 120 are all arranged within each one of the couplers 106 to lie in axial alignment with one another. When the push-button 125 of one coupler 106 is initially at rest and no pushing force is being applied thereto, the spring 122 positioned between the lower gear drive housing 110 and the gear wheel 118 is relaxed and expanded, and the teeth 119 of the gear wheel 118 are partially meshed with the teeth 123 and 124 of the gear drives 116 and 117 of the upper and lower gear drive housings 108 and 110. Thus, as just explained, the U-shaped gripping bar 104 of the rotatable handlebar assembly 42 which is joined at opposite ends thereof to the pair of couplers 106 by way of respective upper handle arm 112 is locked in place.

However, when a pushing force is manually applied to one of the push-buttons 125 from one of the couplers 106, the push-button is moved through the coupler cavity 126 formed in the upper gear drive housing 108 towards the gear wheel 118. Accordingly, gear wheel 118 is pushed by the push-button 125 along the gear wheel shaft 120 towards the lower gear drive housing 110, such that the spring 122 lying between the gear wheel 118 and the lower gear drive housing 110 will be compressed.

The gear wheel 118 is therefore pushed by the push-button 125 out of the upper gear drive housing 108 so as to be located entirely inside and surrounded by the gear drive 117 of the lower gear drive housing 110 such that the teeth 119 of gear wheel 118 are now completely meshed with the teeth 124 of the lower gear drive housing 110. Inasmuch as the toothed gear wheel 118 has been completely removed from the upper gear drive housing 108, the U-shaped gripping bar 104 of the handlebar assembly 42 that is coupled to the pair of handlebar uprights 44 is now unlocked and free to rotate at the pair of push-button actuated couplers 106 to any angle between its aforementioned horizontal and vertical positions.

Once the gripping bar 104 has been rotated to a position to suit the needs of the user, the pushing force applied to each push-button 125 of each push-button actuated coupler 106 is terminated. The spring 122 located between wheel 118 and housing 110 will expand, and the push-button is automatically returned to its initial at-rest position. At the same time, the gear wheel 118 is pushed outwardly from the lower gear drive housing 110 and moved along shaft 120 towards the upper gear drive housing 108 so as to once again be partially received by both housings 108 and 110 and meshed with the teeth 123 and 124 of the gear drives 116 and 117 thereof. The U-shaped gripping bar 104 is correspondingly locked in place to prevent any further rotation thereof.

Each of the pair of push-button actuated couplers 106 has been described when referring to FIGS. 11-14 as controlling the rotation of the gripping bar 104 of the handlebar assembly 42. However, this same push-button actuated coupler (i.e., 106) can also be substituted for the push-button actuated elbow 96 that is shown in FIG. 7 by which the coupled and force receiving portions 92 and 94 of the wagon transport handle 38 are pivotally connected end-to-end and rotatable relative to one another.

Figure 14:
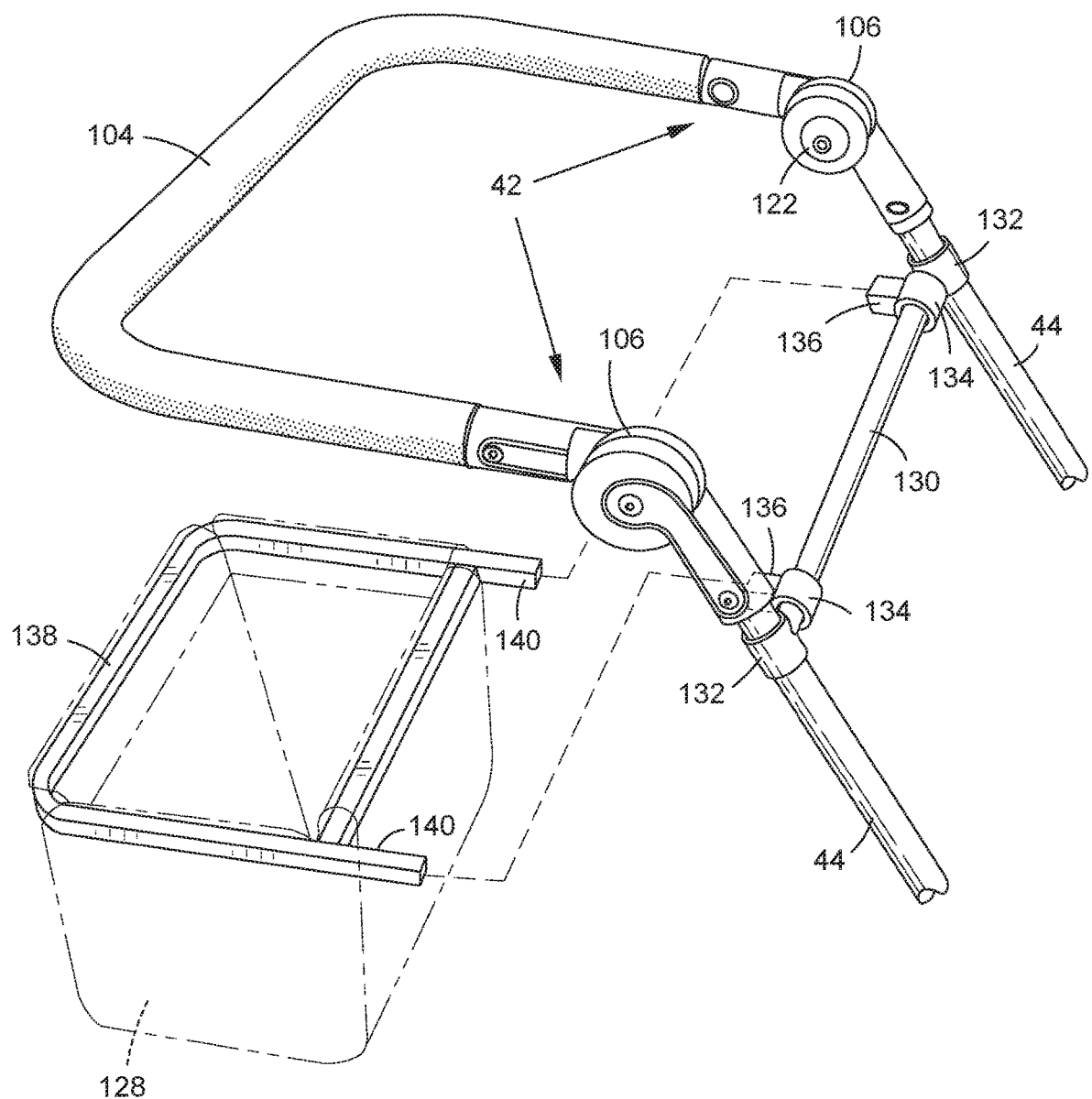
FIG. 14 shows an optional utility basket detachably connected to the rear of the folding wagon at the pair of handlebar uprights thereof.

FIG. 14 of the drawings also shows an optional add-on utility basket 128 to be carried at the rear of the folding wagon 1 in which to transport any of a variety of articles including those that may be used by the child being transported by the wagon in one of the fold down seats 48. A cross bar 130 extends horizontally between the vertical handlebar uprights 44 that extend upwardly along opposite sides of the wagon basket 3. A collar 132 which is attached to each end of the cross bar 130 is coupled in surrounding engagement to each one of the handlebar uprights 44. A pair of similar collars 134 are coupled in surrounding engagement with the cross bar 130 at opposite ends thereof. A mounting sleeve 136 projects outwardly and rearwardly from each of the collars 134 that surround the cross bar 130.

The utility basket 128 is supported around the open top thereof by a generally "D" shaped frame 138 such that the basket is suspended by and hangs downwardly from the frame. A pair of mounting posts 140 project outwardly and forwardly from opposite sides of the basket frame 138. The basket 128 is detachably connected to the rear of the wagon 1 when the pair of mounting posts 140 are slidably and removably received within respective ones of the mounting sleeves 136 which extend from the collars 134 that surround the cross bar 130. Prior to the gripping bar 104 of handlebar assembly 42 being rotated at couplers 106 to its vertical position shown in FIG. 11, the utility basket 128 is first detached from the wagon by removing the mounting posts 140 of the basket frame 138 from the mounting sleeves 136 of cross bar 130.

Referring now to FIGS. 15 and 16 of the drawings, an optional table 142 is shown to be detachably connected to the folding wagon 1 so as to extend laterally across the top of the wagon basket 3. A pair of table mounting pipes 144 extend upwardly from the basket support rack 5 so as to run vertically along opposite sides of the basket 3. A corresponding pair of table mounting posts 146 extend downwardly from opposite sides of the table 142. The table is detachably connected to the wagon 1 and held in place across the basket 3 thereof when the table mounting posts 146 are removably received within respective ones of the table mounting pipes 144. A pair of cup receptacles 148 are formed in the table 142 within which to receive and retain a pair of conventional drinking cups (not shown).

FIGS. 15 and 16 also show a pair of optional fold-over side flaps 150 that are folded over opposite sides of the wagon basket 3. The side flap 150 are attached inside the basket 3 and extend therefrom so as to lie along the outside of the basket. Each side flap 150 has a pocket 152 running longitudinally therealong in which a variety of articles can be transported with the wagon 1.

The invention claimed is:

1. A wagon having a front and a rear and comprising:
    a frame extending between the front and the rear of the wagon;
    a basket support rack;
    a basket having an open top and a closed bottom, said basket being carried by and held above said basket support rack by said frame;
    at least one wheel connected to said frame to enable said wagon to roll along a surface from place-to-place; and
    a seat located inside said basket and pivotally connected to said basket support rack, said seat being rotatable relative to said basket support rack between a vertical position standing upwardly within said basket and a horizontal position lying substantially flat along the closed bottom of said basket, said seat having a seat portion adapted to support the weight of an individual seated in the seat and a back portion pivotally coupled to said seat portion at which to be adapted to support the back of the seated individual, said seat portion and said back portion rotating simultaneously with one another within said wagon when said seat rotates between said vertical and horizontal positions, and said seat also having a seat support frame to which the seat portion of said seat is attached and a back support frame to which the back portion of said seat is attached, said seat support frame being pivotally connected to said back support frame.

2. The wagon recited in claim 1, wherein each of said seat support frame and said back support frame is pivotally connected to the basket support rack of said wagon so that the seat and back portions of said seat rotate simultaneously with one another.

3. The wagon recited in claim 1, wherein there is a foot extension opening located in said basket support rack in front of said seat and adapted to receive therethrough the feet of an individual seated on said seat within said basket.

4. The wagon recited in claim 3, further comprising a foot pocket attached underneath the closed bottom of said basket so as to lie below the foot extension opening in said basket support rack in order to enclose the feet of the seated individual that are received through said foot extension opening.

5. The wagon recited in claim 1, wherein said basket is flexible and each of said frame and said basket support rack is collapsible when said seat is in the horizontal position by which said wagon is folded from an expanded configuration at which said frame is outstretched horizontally to a compact configuration at which said frame is collapsed vertically upon itself.

6. The wagon recited in claim 1, further comprising a seat belt assembly attached to said seat and including a pair of shoulder restraining straps and at least one waist restraining strap, said shoulder retaining straps and said waist restraining strap being coupled to one another to surround and restrain the shoulders and the waist of an individual seated in the seat.

7. The wagon recited in claim 1, further comprising a wagon transport handle pivotally coupled to said frame and being rotatable through an angle of at least 180 degrees between a first rotated position lying within said basket and a second rotated position extending outwardly from the front of said wagon at which to receive a pulling or a pushing force.

8. The wagon recited in claim 7, wherein said wagon transport handle has a first end thereof pivotally coupled to said frame, an opposite end at which a grip is located to receive said pulling or pushing force, and a coupler pivotally connected between said first and opposite ends, the opposite end of said wagon transport handle being rotatable at said coupler between a first coupled position axially aligned with said first end and a second coupled position lying alongside said first end.

9. The wagon recited in claim 8, wherein said coupler includes means by which to lock the opposite end of said wagon transport handle in said first coupled position axially aligned with the first end of said wagon transport handle and a push-button to which a pushing force is applied to cause said opposite end to be unlocked from said first coupled position and rotatable at said coupler to said second coupled position.

10. The wagon recited in claim 1, further comprising a handlebar assembly having a handlebar being rotatable relative to said frame between a first position extending horizontally outward from the rear of said wagon at which to receive a pulling or a pushing force and a second position extending vertically downward and lying adjacent said frame.

11. The wagon recited in claim 10, wherein said handlebar assembly has a coupler by which said handlebar is pivotally coupled to and rotatable relative to said frame between said first and second positions.

12. The wagon recited in claim 11, wherein said coupler includes locking means by which to lock the handlebar of said handlebar assembly in said first position extending horizontally outward from the rear of said wagon and a push-button to which a pushing force is applied to cause said handlebar to be unlocked from said first position and rotatable at said coupler to said second position.

13. The wagon recited in claim 10, further comprising handlebar uprights extending substantially vertically from said frame at the rear of said wagon and lying above said basket, the handle of said handlebar assembly being pivotally coupled to said frame by way of said handlebar uprights.

14. The wagon recited in claim 13, further comprising a utility basket detachably connected to the rear of said wagon and suspended from said handlebar uprights.

15. The wagon recited in claim 1, further comprising a table having table mounting posts located at opposite sides thereof and hollow table mounting pipes connected to said basket support rack and extending vertically upward therefrom along opposite sides of said basket, said table mounting posts being removably received by respective ones of said table mounting pipes, whereby said table is detachably connected to said wagon so as to extend laterally across the open top of said basket.

16. A wagon having a front and a rear and comprising:
a frame extending between the front and the rear of the wagon;
a basket having an open top and a closed bottom, said basket being carried by and held above said basket by said frame;
at least one wheel connected to the frame at the front of the wagon, and at least one wheel connected to the frame at the rear of the wagon;
a wagon transport handle pivotally coupled to said frame and being rotatable through an angle of at least 180 degrees between a first position lying within said basket and a second position lying outside said basket and extending from the front of said wagon at which to receive a first pulling force or a first pushing force; and
a handlebar rotatable between a first position extending horizontally outward from said frame at the rear of said wagon at which to receive a second pulling force or a second pushing force and a second position extending vertically downward and lying adjacent said frame.

17. The wagon recited in claim 16, wherein said wagon transport handle has a first end thereof pivotally coupled to said frame, an opposite end at which a grip is located to receive said first pulling force or said first pushing force, and a coupler pivotally connected between said first and opposite ends, the opposite end of said wagon transport handle being rotatable at said coupler between a first location at which to be axially aligned with said first end and a second location at which to lie alongside said first end.

18. The wagon recited in claim 16, further comprising handlebar uprights extending substantially vertically from said frame at the rear of said wagon and lying above said basket, said handlebar being pivotally coupled to said frame by way of said handlebar uprights so that said handlebar is rotatable relative to said handlebar uprights between said first and second positions.

19. A wagon having a front and a rear and comprising:
a frame extending between the front and the rear of the wagon;
a basket support rack;
a basket having an open top and a closed bottom, said basket being carried by and held above said basket support rack by said frame;
at least one wheel connected to said frame to enable said wagon to roll along a surface from place-to-place;
a seat located inside said basket and pivotally connected to said basket support rack below said basket, said seat being rotatable relative to said basket support rack between a vertical position standing upwardly within said basket and a horizontal position lying substantially flat against the closed bottom of said basket; and
a foot extension opening located in said basket support rack in front of said seat and configured to receive therethrough the feet of an individual seated on said seat within said basket.

20. The wagon recited in claim 19, further comprising a foot pocket attached underneath the closed bottom of said basket so as to lie below the foot extension opening in said basket support rack and adapted to enclose the feet of the seated individual that are received through said foot extension opening.

21. A wagon having a front and a rear and comprising:
a frame extending between the front and the rear of the wagon;
a basket support rack;
a basket having an open top and a closed bottom, said basket being carried by and held above said basket support rack by said frame;
at least one wheel connected to said frame to enable said wagon to roll along a surface from place-to-place;
a seat located inside said basket and pivotally connected to said basket support rack below said basket, said seat being rotatable relative to said basket support rack between a vertical position standing upwardly within said basket and a horizontal position lying substantially flat against the closed bottom of said basket; and
a table having table mounting posts located at opposite sides thereof and hollow table mounting pipes connected to said basket support rack and extending vertically upward therefrom along opposite sides of said basket, said table mounting posts being removably received by respective ones of said table mounting pipes, whereby said table is detachably connected to said wagon so as to extend laterally across the open top of said basket.

22. A wagon having a front and a rear and comprising:
a frame extending between the front and the rear of the wagon;
a basket support rack;
a basket having an open top and a closed bottom, said basket being carried by and held above said basket support rack by said frame;
at least one wheel connected to said frame to enable said wagon to roll along a surface from place-to-place;
a seat located inside said basket and pivotally connected to said basket support rack below said basket, said seat being rotatable relative to said basket support rack between a vertical position standing upwardly within said basket and a horizontal position lying substantially flat against the closed bottom of said basket; and
a wagon transport handle pivotally coupled to said frame and being rotatable through an angle of at least 180 degrees between a first rotated position lying within said basket and a second rotated position extending outwardly from the front of said wagon at which to receive a pulling or a pushing force, said wagon transport handle having a first end pivotally coupled to said frame, an opposite end at which a grip is located to receive said pulling or pushing force, and a coupler pivotally connected between said first and opposite ends, the opposite end of said wagon transport handle being rotatable at said coupler between a first coupled position axially aligned with said first end and a second coupled position lying alongside said first end.

23. The wagon recited in claim 22, wherein said coupler includes locking means by which to lock the opposite end of said wagon transport handle in said first coupled position axially aligned with the first end of said wagon transport handle and a push-button to which a pushing force is applied to cause said opposite end to be unlocked from said first coupled position and rotatable at said coupler to said second coupled position.

* * * * *